US011232132B2

(12) United States Patent
Ramachandra Iyer et al.

(10) Patent No.: US 11,232,132 B2
(45) Date of Patent: Jan. 25, 2022

(54) METHOD, DEVICE, AND SYSTEM FOR CLUSTERING DOCUMENT OBJECTS BASED ON INFORMATION CONTENT

(71) Applicant: WIPRO LIMITED, Bangalore (IN)

(72) Inventors: Manjunath Ramachandra Iyer, Bangalore (IN); Boby Chaitanya Villari, Bengaluru (IN); Rameshwar Pratap, Bangalore (IN)

(73) Assignee: Wipro Limited, Bangalore (IN)

( * ) Notice: Subject to any disclaimer, the term of this patent is extended or adjusted under 35 U.S.C. 154(b) by 340 days.

(21) Appl. No.: 16/260,212

(22) Filed: Jan. 29, 2019

(65) Prior Publication Data
US 2020/0175041 A1 Jun. 4, 2020

(30) Foreign Application Priority Data

Nov. 30, 2018 (IN) .............................. 201841045339

(51) Int. Cl.
*G06F 16/28* (2019.01)
*G06F 16/242* (2019.01)
(Continued)

(52) U.S. Cl.
CPC ............ *G06F 16/285* (2019.01); *G06F 16/22* (2019.01); *G06F 16/2423* (2019.01); *G06F 16/24578* (2019.01)

(58) Field of Classification Search
CPC ...... G06F 16/1748; G06F 16/93; G06F 40/10; G06F 40/117; G06F 40/14; G06F 16/285;
(Continued)

(56) References Cited

U.S. PATENT DOCUMENTS 5,604,910 A * 2/1997 Kojima ............ G06F 16/90344
7,499,923 B2 3/2009 Kawatani
(Continued)

FOREIGN PATENT DOCUMENTS

CN 102081598 A 6/2011

OTHER PUBLICATIONS

Wei, C., et al., "A Personalized Document Clustering Approach to Addressing Individual Categorization Preferences", Proceedings of the Third Workshop of Knowledge Economy and Electronic Commerce, pp. 118-129.

*Primary Examiner* — Apu M Mofiz
*Assistant Examiner* — Farhad Agharahimi
(74) *Attorney, Agent, or Firm* — Finnegan, Henderson, Farabow, Garrett & Dunner, LLP

(57) ABSTRACT

This disclosure relates to method, device, Wand system for clustering document objects based on information content. The method may include identifying a plurality of object chunks from at least one document based on semantic context of each of the plurality of object chunks, determining at least one document portion from the at least one document as a base document based on a plurality of parameters applied to the plurality of object chunks, determining a plurality of hierarchies within the base document, and categorizing the plurality of object chunks based on the plurality of hierarchies and information in each of the plurality of object chunks. It should be noted that each of the plurality of object chunks may include at least one object selected from the at least one document.

19 Claims, 7 Drawing Sheets

(51) Int. Cl.
*G06F 16/2457* (2019.01)
*G06F 16/22* (2019.01)

(58) Field of Classification Search
CPC ............... G06F 16/22; G06F 16/24578; G06F 16/2423; G06K 9/00469; G06K 9/00456; G06K 9/00463
See application file for complete search history.

(56) References Cited

U.S. PATENT DOCUMENTS

| | | | |
|---|---|---|---|
| 8,977,953 | B1 | 3/2015 | Pierre et al. |
| 2002/0019826 | A1 | 2/2002 | Tan |
| 2009/0276378 | A1* | 11/2009 | Boguraev ............. G06F 40/117 706/12 |
| 2014/0149401 | A1* | 5/2014 | Liu ....................... G06F 16/951 707/723 |
| 2015/0046435 | A1* | 2/2015 | Donneau-Golencer ..................... G06F 16/24578 707/722 |
| 2015/0324338 | A1* | 11/2015 | Levy ..................... G06F 40/186 715/244 |
| 2016/0299891 | A1* | 10/2016 | Koutrika ........... G06F 16/24578 |

* cited by examiner

METHOD, DEVICE, AND SYSTEM FOR CLUSTERING DOCUMENT OBJECTS BASED ON INFORMATION CONTENT

TECHNICAL FIELD

This disclosure relates generally to information retrieval and more particularly to method, device, and system for clustering document objects based on information content.

BACKGROUND

Data clustering is a technique that has been widely used in providing relevant and quality information to users by organizing data into smaller clusters. Several approaches have been proposed to perform data clustering and subsequent information retrieval. However, these approaches suffer from one or the other problems including, but not limited to, duplicity of information, lack of integrity of information, and relevancy of content. For example, dynamic clustering of multimedia content (e.g., document, presentation, or the like) into different bins with varying degree of information may be challenging due to heterogeneous nature of the data (e.g., text, image, video, or the like) and similarity of information in the multimedia content. Clustering of documents, such as closely related documents, that include overlapping information, either in part or in total, fail to aid in efficient and effective retrieval of information. Information retrieved after clustering such documents may contain duplications of information that results not only in wastage of time and resources but also in increasing confusion.

In short, conventional clustering techniques fail to identify duplications among the documents and to provide a single continuous flow of information concatenated from across the documents.

SUMMARY

In one embodiment, a method of clustering document objects based on information content is disclosed. In one example, the method includes identifying a plurality of object chunks from at least one document based on semantic context of each of the plurality of object chunks. Each of the plurality of object chunks may include at least one object selected from the at least one document. The method further includes determining at least one document portion from the at least one document as a base document based on a plurality of parameters applied to the plurality of object chunks. The method further includes determining a plurality of hierarchies within the base document. The method further includes categorizing the plurality of object chunks based on the plurality of hierarchies and information in each of the plurality of object chunks.

In another embodiment, a system for clustering document objects based on information content is disclosed. In one example, the system includes a document clustering device, which includes a processor and a memory communicatively coupled to the processor. The memory stores processor-executable instructions, which on execution, causes the processor to identify a plurality of object chunks from at least one document based on semantic context of each of the plurality of object chunks. Each of the plurality of object chunks may include at least one object selected from the at least one document. The processor-executable instructions, on execution, further cause the processor to determine at least one document portion from the at least one document as a base document based on a plurality of parameters applied to the plurality of object chunks. The processor-executable instructions, on execution, further cause the processor to determine a plurality of hierarchies within the base document. The processor instructions, on execution, further cause the processor to categorize the plurality of object chunks based on the plurality of hierarchies and information in each of the plurality of object chunks.

In yet another embodiment, a non-transitory computer-readable storage medium storing computer-executable instructions for clustering document objects based on information content is disclosed. In one example, the stored instructions, when executed by a processor, cause the processor to perform operations including identifying a plurality of object chunks from at least one document based on semantic context of each of the plurality of object chunks. Each of the plurality of object chunks may include at least one object selected from the at least one document. The operations further include determining at least one document portion from the at least one document as a base document based on a plurality of parameters applied to the plurality of object chunks. The operations further include determining a plurality of hierarchies within the base document. The operations further include categorizing the plurality of object chunks based on the plurality of hierarchies and information in each of the plurality of object chunks.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
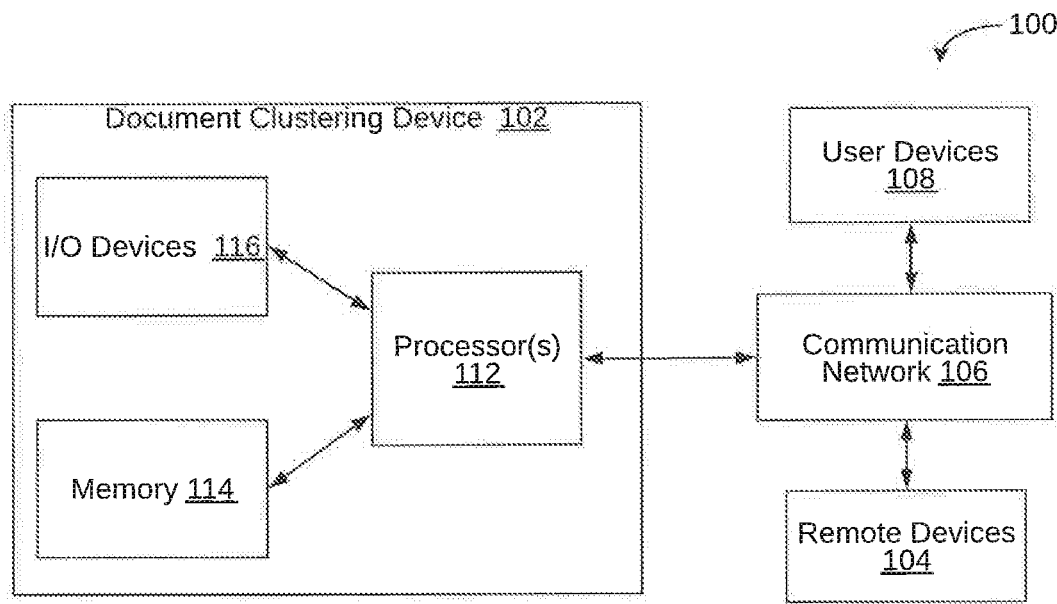
FIG. 1 is a block diagram illustrating a system for clustering document objects based on information content and for retrieving information based on a user query, in accordance with some embodiments of the present disclosure.

Referring now to FIG. 1, an exemplary system 100 for clustering document objects based on information content and for retrieving information based on a user query is illustrated, in accordance with some embodiments of the present disclosure. In particular, the system 100 includes a document clustering device 102 to cluster the document objects based on the information content and to retrieve information based on the user query. It should be noted that the term 'content' used in this disclosure refers to documents, which, in turn, includes data in various formats (e.g., text, image, figure, tables, graph, video, or the like) from different sources (e.g., product manuals, troubleshooting documents, brochures, books, reference materials, or the like).

As will be described in greater detail in conjunction with FIGS. 2-8, the document clustering device 102 identifies a number of object chunks from one or more documents based on semantic context of each of the object chunks, determines one or more document portions from the one or more documents as a base document based on a number of parameters applied to the object chunks, determines a number of hierarchies within the base document, and categorizes the object chunks based on the hierarchies and information in each of the object chunks. It should be noted that each of the object chunks includes one or more objects selected from the document. Further, the document clustering device 102 receives a user query, extracts keywords from the user query to determine a context of the user query, compares the extracted keywords with each of the hierarchies to identify a hierarchy matching the extracted keywords, retrieves one or more object chunks from a set of chunks categorized within the matching hierarchy, and presents the one or more object chunks to a user generating the user query.

The document clustering device 102 may include, but is not limited to, a server, a desktop, a laptop, a notebook, a netbook, a tablet, a smartphone, and a mobile phone. In particular, the document clustering device 102 includes a processor 112 that is communicatively coupled to a memory 114, which may be a non-volatile memory or a volatile memory. Examples of non-volatile memory include, but are not limited to, a flash memory, a Read Only Memory (ROM), a Programmable ROM (PROM), Erasable PROM (EPROM), and Electrically EPROM (EEPROM) memory. Examples of volatile memory includes, but are not limited to, Dynamic Random-Access Memory (DRAM), and Static Random-Access memory (SRAM). The memory 114 may store instructions that, when executed by the processor 112, cause the processor 112 to cluster the document objects and to retrieve information, in accordance with some embodiments of the present disclosure. In particular, the memory 114 includes various modules that enable the document clustering device 102 to cluster the document objects based on the information content and to retrieve information based on the user query. These modules are explained in detail in conjunction with FIG. 2. The memory 114 may also store various data (e.g., documents, object chunks, document portions, parameters to be applied to the object chunks, hierarchies of object chunks, summary quotient, index for the object chunks, user query, keywords extracted from user query, history associated with user, etc.) that may be captured, processed, and/or required by the document clustering device 102. The document clustering device 102 further includes input/output devices 116 so as to interact with a user (e.g., an administrator). For example, the input/output device 116 may include a display having a User Interface (UI) that may be used by the administrator to provide various inputs to document clustering device 102 as well as to retrieve various information (e.g., analysis performed by the document clustering device 102).

The document clustering device 102 may interact with one or more external devices over the communication network 106 for sending or receiving various data. For example, the document clustering device 102 may interact with one or more remote device 104 or one or more user devices 108. The communication network 106 may be a wired or a wireless network including, but not limited to, Internet, wireless local area network (WLAN), Wi-Fi, Long Term Evolution (LTE), worldwide interoperability for microwave access (WiMAX), and general packet radio service (CPRS). The user devices 108 include, but are not limited to, a server, a desktop, a laptop, a notebook, a netbook, a tablet, a smartphone, and a mobile phone. The document clustering device 102 may receive documents for clustering object chunks or may receive a user query for information retrieval from the one or more of the user devices 108. Further, the document clustering device 102 may provide information to the one or more of the user devices 108 based on the received user query. It should be noted that, in some embodiments, functionalities of the document clustering device 102 may be implemented in each of the user devices 108. Similarly, the remote device 104 includes, but is not limited to, an application server, a laptop, a desktop, a smartphone, or a tablet. The remote device 104 may store various documents that may be processed by the document clustering device 102 to generate hierarchies of the object chunks. Additionally, in some embodiments, the remote device 104 may store the generated hierarchies of object chunks. It should be noted that, in some embodiments, functionalities of the document clustering device 102 may be implemented in one or more of the remote devices 104. By way of an example, when the user initiates a query through a user device 108, the document clustering device 102 analyzes the query received from the user device 108 and generates a response to the query. The response is generated by accessing the pre-generated hierarchies of object chunks either from its own memory or from the remote server 104.

Figure 2:
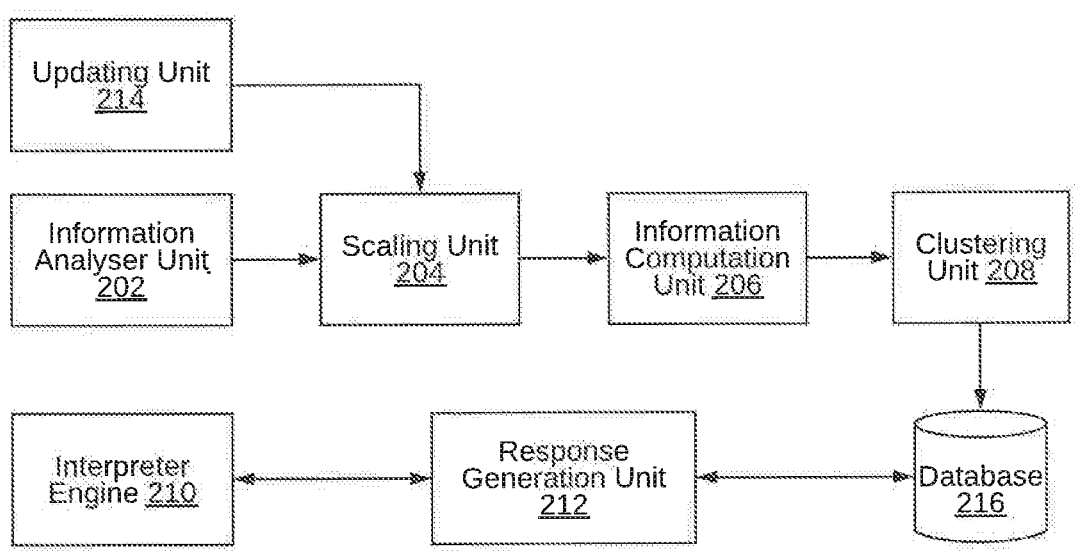
FIG. 2 is a block diagram depicting various modules within a memory of a document clustering device configured to cluster document objects based on information content, in accordance with some embodiments of the present disclosure.

Referring now to FIG. 2, a block diagram depicting various modules within the memory 114 of the document clustering device 102 is illustrated, in accordance with some embodiments of the present disclosure. The memory 114 includes an information analyzer unit 202, a scaling unit 204, an information computation unit 206, a clustering unit 208, an interpreter engine 210, a response generation unit 212, an updating unit 214 and a database 216. As will be appreciated by those skilled in the art, all such aforementioned modules 202-216 may be represented as a single module or a combination of different modules. Moreover, as will be appreciated by those skilled in the art, each of the modules 202-216 may reside, in whole or in parts, on one device or multiple devices in communication with each other.

The information analyzer unit 202 receives one or more documents from the user devices 108 or remote devices 104. As stated above, the documents include data in various formats (e.g., text, image, figure, tables, graph, video, or the like) from different sources (e.g., product manuals, troubleshooting documents, brochures, books, reference materials, or the like). After ingesting the documents, the information analyzer unit 202 identifies a number of object chunks from the one or more documents based on semantic context of each of the object chunks. It should be noted that each of the object chunks includes one or more objects selected from the one or more documents. In case, the document has non-textual objects (e.g., figures, graphs, and tables, or the like), the information analyzer unit 202 processes the metadata to gather details of the object. The information analyzer unit 202 further determines one or more document portions from the one or more documents as a base document based on a number of parameters applied to the object chunks. The number of parameters includes, but is not limited to, number of object chunks in each document portion, number of object chunks in each document portion that are common with remaining document portions, number of object chunks in each document portion that overlap with one or more of the remaining document portions, or number of documents that each document portion overlaps.

The scaling unit 204 receives the base document along with the object chunks from the information analyzer unit 202. The scaling unit 204 then generates hierarchies (e.g., the list of topics forming hierarchy) within the base document based on the keywords. In some embodiments, the hierarchies may be generated by summarizing the base document into hierarchies of keywords. The keywords are derived from headings or subheadings in the base document or from summary of chunks of data in the base document. Once the hierarchies are decided within the base document, the scaling unit 204 considers other documents for clustering and refining the hierarchies. To this end, the scaling unit 204 receives object chunks from other documents from the updating unit 214. The scaling unit 204 then refines or enhances the hierarchies by arranging these object chunks into the hierarchies. This is explained in greater detail in conjunction with FIGS. 3-6.

The information computation unit 206 receives the generated hierarchies along with the object chunks from the scaling unit 204. Further, the information computation unit 206 computes amount of information in each object chunk from each document. In other words, the size of the chunk is determined based on the information content. In some embodiments, the amount of information in each chunk is computed by computing probability and information contained by high frequency terms in each object chunk. Further, in some embodiments, the information contained is computed based on the number of references of any named entity (i.e., terms other than preposition, conjunction, etc.) and the total number of terms. This is further explained in greater detail in conjunction with FIGS. 3-6.

The clustering unit 208 receives the object chucks, the amount of information in each chunk, and the hierarchies from the information computation unit 206. The clustering unit 208 then clusters or categorizes object chunks based on similar quantum of information (i.e., about equal information in terms of quantity and content) so that similar pieces of information are grouped together at right hierarchies. In other words, the object chunks having similar information or summary are arranged into one hierarchy which can be defined by high frequency terms. This is further explained in greater detail in conjunction with FIGS. 3-6. The clustered information (e.g., grouped chunks of information) is stored in the database 216. Further, the clustered information is accessed from the database 216 when the user requests for the information. As stated above, the database 216 may be internal to the document clustering device 102 or may be implemented on an external device (e.g., remote server).

Once all documents are processed so as to generate and store hierarchies of object chunks, the document clustering device 102 is ready to provide information based on a user query (i.e., information retrieval). In particular, a user interacts with the document clustering device 102 with the user query so as to obtain the required information. The response to the user query may span a short paragraph or a large number of pages, based on the type of the data requested, the domain, and the document source.

The interpreter engine 210 receives the user query from one of the user devices 108. The user query may include, but not limited to, a text query or a vocal query and is typically in the form of a search or a question. Upon receiving the user query, the interpreter engine 210 translates the query into keywords so as to determine a context of the user query. The context of the user query is subsequently used by the response generation unit 212 to determine appropriate response (i.e., information from most appropriate hierarchies of object chunks). Further, the interpreter engine 210 receives the response to the user query from the response generation unit 212 and presents the received response to one of the user devices 108 generating the user query.

The response generation unit 212 receives the keywords extracted from the user query from the interpreter engine 210 and provides the response to the user query to the interpreter engine 210 by accessing the content stored in the database 216. The response is based on the keywords. In particular, the response generation unit 212 compares the extracted keywords with each of the hierarchies in the database 216 so as to identify a hierarchy matching the extracted keywords. The response generation unit 212 then retrieves one or more object chunks from a set of chunks categorized within the matching hierarchy. In other words, the response generation unit 212 extracts the object chunks, relevant to the user query, from the categorized object chunks stored in the database 216 so as to form the response. It should be noted that the extraction of object chunk depends on the plurality of factors including, but not limited to, user's familiarity with the source document, ratings of the document on a social media, the user's experience with the document, and history of the user.

As stated above, the updating unit 214 is configured to include a new document to the corpus of documents analyzed by the document clustering device 102. Upon receiving the new document, the updating unit 214 summarizes the added document and identifies object chunks from the document. The updating unit 214 then provides the identified object chunks to the scaling unit 204, which then refines or enhances the hierarchies.

Figure 3:
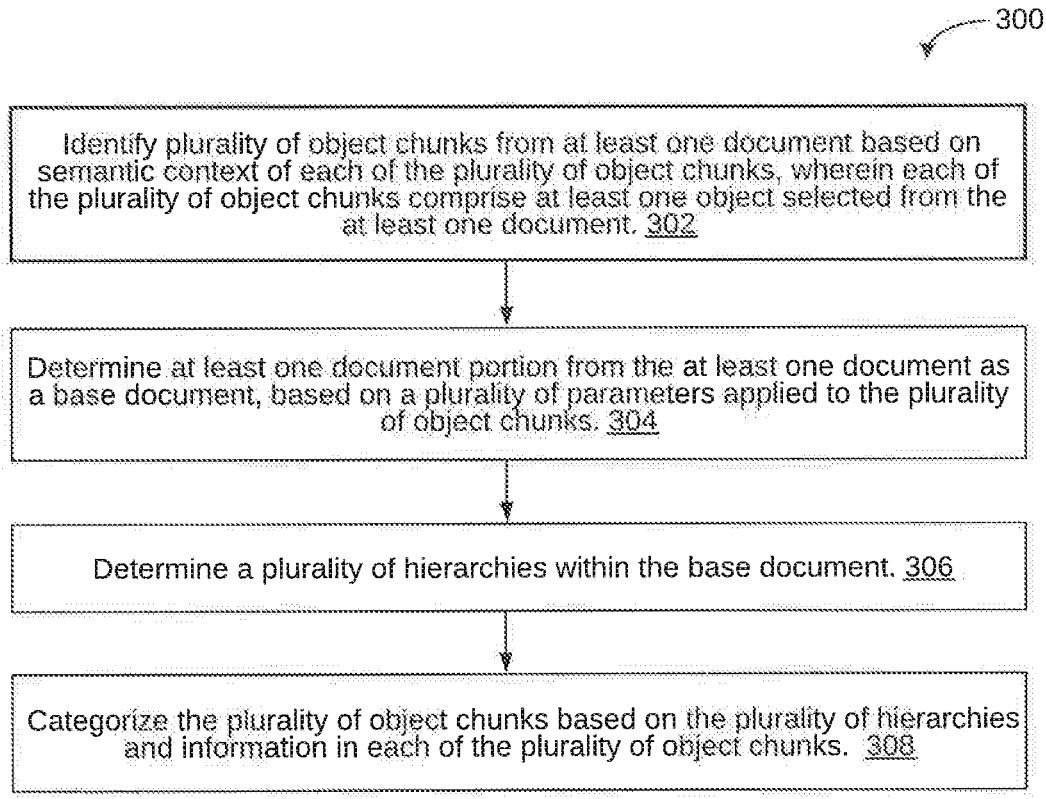
FIG. 3 is a flowchart of a method for clustering document objects based on information content, in accordance with some embodiments of the present disclosure.

Referring now to FIG. 3, a flowchart of a method for clustering document objects based on information content is illustrated, in accordance with some embodiments of the present disclosure. Upon initiation of a clustering application (implemented by the document clustering device 102) from a user device 108, the document clustering device 102 may acquire and process the document so as to cluster document objects based on the information content. In particular, at step 302, the document clustering device 102 may identify a plurality of object chunks from at least one document based on semantic context of each of the plurality of object chunks. In order to identify object chunks, document clustering device 102 summarizes the paragraphs of each document either in total or in parts. In some embodiments, the document clustering device 102 may summarize a part of the paragraph (say, about 50%), and then adds the sentences one by one to the paragraph and summarizes the same. For adding this sentence to object chunk (i.e., the part of the paragraph), the document clustering device 102 computes a summary quotient based on the length of newly added sentence to the paragraph and total length of the paragraph after addition of a new sentence. After computation of the summary quotient, document clustering device 102, compares the summary quotient with a predefined threshold. If the summary quotient exceeds the predefined threshold value, the document clustering device 102 demarcates the object chunk. The method from addition of sentence to object chunk to comparison of the summary quotient is performed every time when there is an addition of a new sentence to an object chunk. This is explained in greater detail in conjunction with FIG. 4. It should be noted that, if two or more paragraphs have the same or similar summary (i.e., an indication of information), they fall into the same group. The entire chunk would be treated as an object with the summary (for example: a single line) indicating its information.

After identification of object chunks from each document, at step 304, the document clustering device 102 determines at least one document portion from at least one document as a base document based on a plurality of parameters. The plurality of parameters includes, but are not limited to, number of object chunks in each document portion, number of object chunks in each document portion that are common with remaining document portions in the plurality of document portions, number of object chunks in each document portion that overlap with one or more of the remaining document portions, or number of documents from the at least one document that each document portion overlaps. After determination of parameters, the document clustering device 102 computes weighted sum of the plurality of parameters for each document portion. The document clustering device 102 selects one or more document portion as the base document on the basis of the highest weighted sum. This is explained in greater detail in conjunction with FIG. 5.

In an embodiment, the document clustering device 102 initially identifies about 50% of total size of paragraph and summarizes it for determination of base document. The remaining lines of paragraph are added one by one and summarized. The process of adding lines stops when the summary generated starts deviating measured by the change in keywords in summary as well as their locations. This is explained in greater detail in conjunction with FIG. 4. The non-textual data are considered in identification of base document based on their metadata/textual description. If they do not contain any metadata/textual information, the non-textual data are directly included into chunks. The non-textual data may include, but is not limited to, figures, equations, charts or tables.

After determination of the base document, at step 306, the document clustering device 102 determines a plurality of hierarchies within the base document. In order to determine hierarchy within the base document, the document clustering device 102 summarizes the base document by retaining the structure of the base document along with its headings and subheadings. Additional hierarchies are created if the base document do not contain any headings or subheadings. The document clustering device 102, prepares hierarchies within the base document based on the summary or keyword in the summary generated for paragraphs.

After determining hierarchy, at step 308, the document clustering device 102 categorizes the plurality of object chunks based on the plurality of hierarchies and information in each of the plurality of object chunks. In order to categorize the object chunks, the document clustering device 102 creates an index for the object chunk based on iterative summarization of the object chunk and extracts information context from the object chunk based on frequency of occurrence of each term in the object chunk and total number of terms in the object chunk. This is explained in greater detail in conjunction with FIG. 6.

The document clustering device 102 may further store this hierarchy of chunks of documents in the database 216 for subsequent use. In particular, the hierarchy of chunks of documents may be employed for efficient and effective retrieval of information against a specific query from a user. For example, the document clustering device 102 may receive a user query, which may include a textual query or a vocal query. The document clustering device 102 may then extract keywords from the user query to determine a context of the user query, compare the extracted keywords with each hierarchy of keywords to identify a hierarchy matching the extracted keywords, retrieve the object chunk from a set of chunks categorized within the matching hierarchy, and presents the object chunk to a user generating the user query. This is explained in greater detail in conjunction with FIG. 8.

Figure 4:
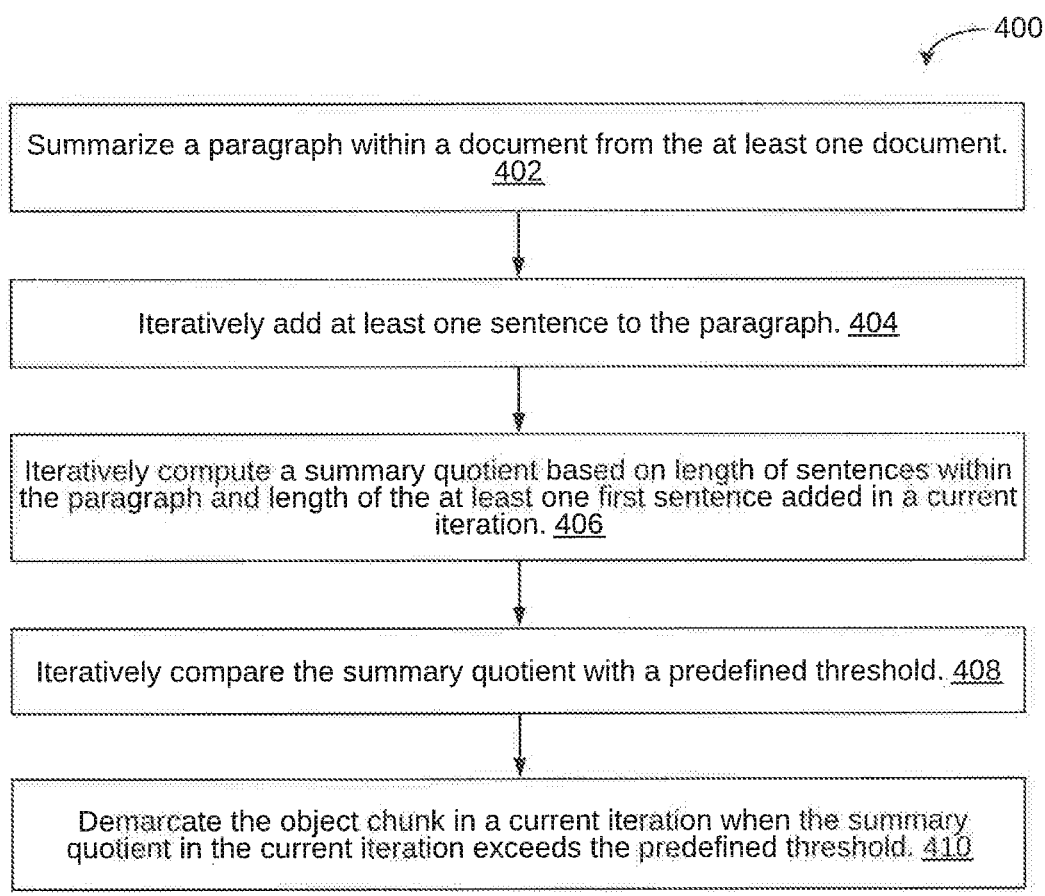
FIG. 4 is a flowchart of a method for identifying an object chunk from a number of object chunks, in accordance with some embodiments of the present disclosure.

Referring now to FIG. 4, a flowchart of a method for identifying an object chunk from the plurality of object chunks is illustrated, in accordance with some embodiments of the present disclosure. At step 402, the document clustering device 102 summarizes a paragraph within a document, either in total or in parts. In an embodiment, the document clustering device 102 initially identifies about 50% of total size of paragraph and summarizes it to extract the information. At step 404, the document clustering device 102 iteratively adds at least one sentence to the paragraph and summarizing the updated paragraph. The process of addition of sentences to the paragraph stops when there is some deviation in summary. This deviation is measured by the change in keywords in summary as well their locations. In an embodiment, at step 406, the document clustering device 102 computes summary quotient to measure the deviation in summary. The summary quotient "Q" is computed by the mathematical formula as per equation (1) below:

$$Q = \frac{\text{Length of the new sentences}}{\text{Length of the old sentence} + \text{length of the new sentences}}$$

After computation of summary quotient, at step 406, the document clustering device 102 compares summary quotient with a predefined threshold. If the summary quotient is less than the threshold, document clustering device 102 may add the sentences to object chunks. But if the summary quotient exceeds the threshold, at step 408, the document clustering device 102 demarcates the object chunk in a current iteration by excluding the new sentence from the demarcated object chunk. The process of computing and comparing summary quotient is done iteratively as there is an addition of a sentence to the object chunk. Further, the summarization may be carried out with chunks across all documents to check if they can be merged to one object chunk.

Figure 5:
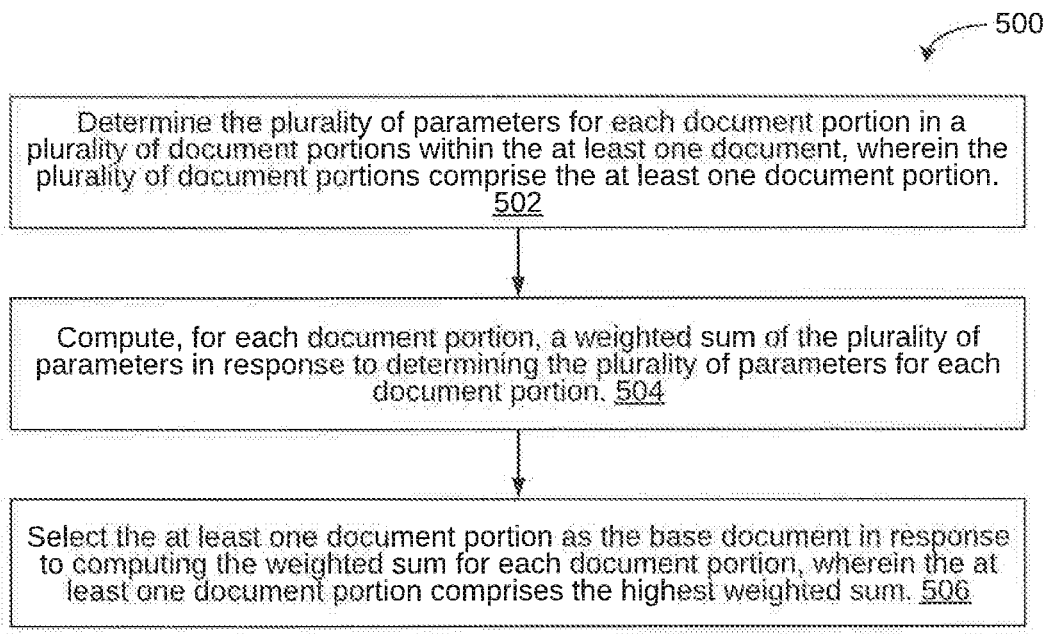
FIG. 5 is a flowchart of a method for determining a document portion from a document as a base document based on a number of parameters applied to the plurality of object chunks, in accordance with some embodiments of the present disclosure.

Referring now to FIG. 5, a flowchart of a method for determining a document portion from a document as the base document is illustrated, in accordance with some embodiments of the present disclosure. The identification of the document portion is based on a plurality of parameters applied to the plurality of object chunks. At step 502, the document clustering device 102 determines the plurality of parameters for each document portion in a plurality of document portions within the at least one document. The plurality of parameters includes number of object chunks in each document portion, number of object chunks in each document portion that are common with remaining document portions in the plurality of document portions, number of object chunks in each document portion that overlap with one or more of the remaining document portions, or number of documents from the at least one document that each document portion overlaps. After determining the parameters, at step 504, the document clustering device 102 computes a weighted sum of the plurality of parameters for each document portion. In an embodiment, following weights for computation of parameters are assigned as shown below:

i. The number of chunks in the document: 0.2 (weight)
  ii. Number of chunks in common with other documents: 0.4
  iii. Maximum number of chunks overlapping with another document: 0.15
  iv. Number of maximum documents it overlaps: 0.25

After computing the sum of weights assigned to parameters, at step 506, the document clustering device 102 selects the document portion having the highest weighted sum as the base document. In an embodiment, the document clustering device, 102, clusters the chunk having a similar summary as that of base document in the hierarchies determined for the base document. Moreover, separate hierarchy is created if the summary of another document is different from but related to those of base document. Thus, the number of hierarchies increases. Further, if the summary of another document is entirely different, then document clustering device 102 merges the summary of another document with the summary of the base document so as to maintain the continuity and broaden the scope of one or more of the hierarchies. If the hierarchies created are more in number, the document clustering device 102 merges hierarchy with the lowest sum into the hierarchy having a large number of object chunks.

Figure 6:
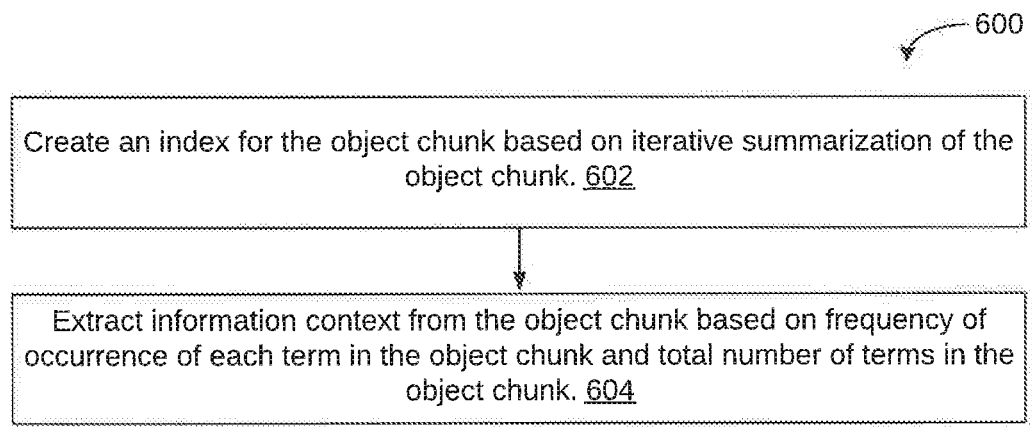
FIG. 6 is a flowchart of a method for categorizing object chunks based on the hierarchies and information in each of the object chunks, in accordance with some embodiments of the present disclosure.

Referring now to FIG. 6, a flowchart of a method for categorizing the plurality of object chunks based on the plurality of hierarchies and information in each of the plurality of object chunks is illustrated, in accordance with some embodiments of the present disclosure. For categorizing object chunks based on the hierarchies, at step 602, the document clustering device 102 creates an index for the object chunk based on iterative summarization of the object chunk. For creating the index for the object chunk, the document clustering device 102, iteratively summarizes the object chunks and extracts the keywords to generate the index for corresponding object chunk. The document clustering device 102, performs iterative summarization to reduce a summary of the object chunk to a predefined number of words so that the object chunk is categorized in a relevant hierarchy based on similarity of the index and the information context with the hierarchy. By way of example, the index may be "deteriorated economy" for the summary of object chunk as "During the second world war, the economy deteriorated. Many countries turned bankrupt". Further, all the paragraphs explaining this or related context may be put under this index. In other words, if the object chunk has more than one sentence, it may be subjected to further summarization to obtain the keyword representing the hierarchy.

After generating an index for the object chunk, at step 604, the document clustering device 102 extracts information context from the object chunk based on frequency of occurrence of each term in the object chunk and total number of terms in the object chunk. In some embodiments, for extracting information context from the object chunk, the document clustering device 102 computes information context as log (N/nt) where "nt" is the frequency of occurrence of each term and "N" is the total number of terms. The term in object chunks includes a named entity. The frequency of term in the object chunk is taken to compute the probability and information contained by high frequency term.

By way of example, a consolidated list of hierarchy or a cluster list is prepared by considering and processing the summary (or clusters) of other documents as follows:

i. If the other document has same summary line, the corresponding chunk in the document is clustered.
  ii. If the summary line is different and fits in between two summary lines of the base document, a placeholder is created for this new summary line. The number of hierarchies increases. In an example, if the base document (a book on world war) contains summary lines— causes of world war-2 and outcome of world war-2, document-2 contains the course of world war-2 (that is not there in summary lines of the base document), a new placeholder is created in between. To obtain this, comparison is made in original text (in multiple levels or iterative summarization, starts from summarized sentence, towards a more detailed version, until original chunk is obtained).
  iii. If a certain sentence in the summary of second document does not fit anywhere in the base document even after comparing original chunks, it is then tried with other documents (and itself). If it does not fit anywhere, the same is merged with the summarized sentence above or below to maintain the continuity.
  iv. When the number of hierarchies is too large, some of them may be merged. In an embodiment, merging starts with the lowest sum i.e., a hierarchy is merged with a level above it or below it depending on whichever one leads to a higher number of object chunks. This is performed for all hierarchies to select the optimal pair that results in largest chunks after merging.

Figure 7:
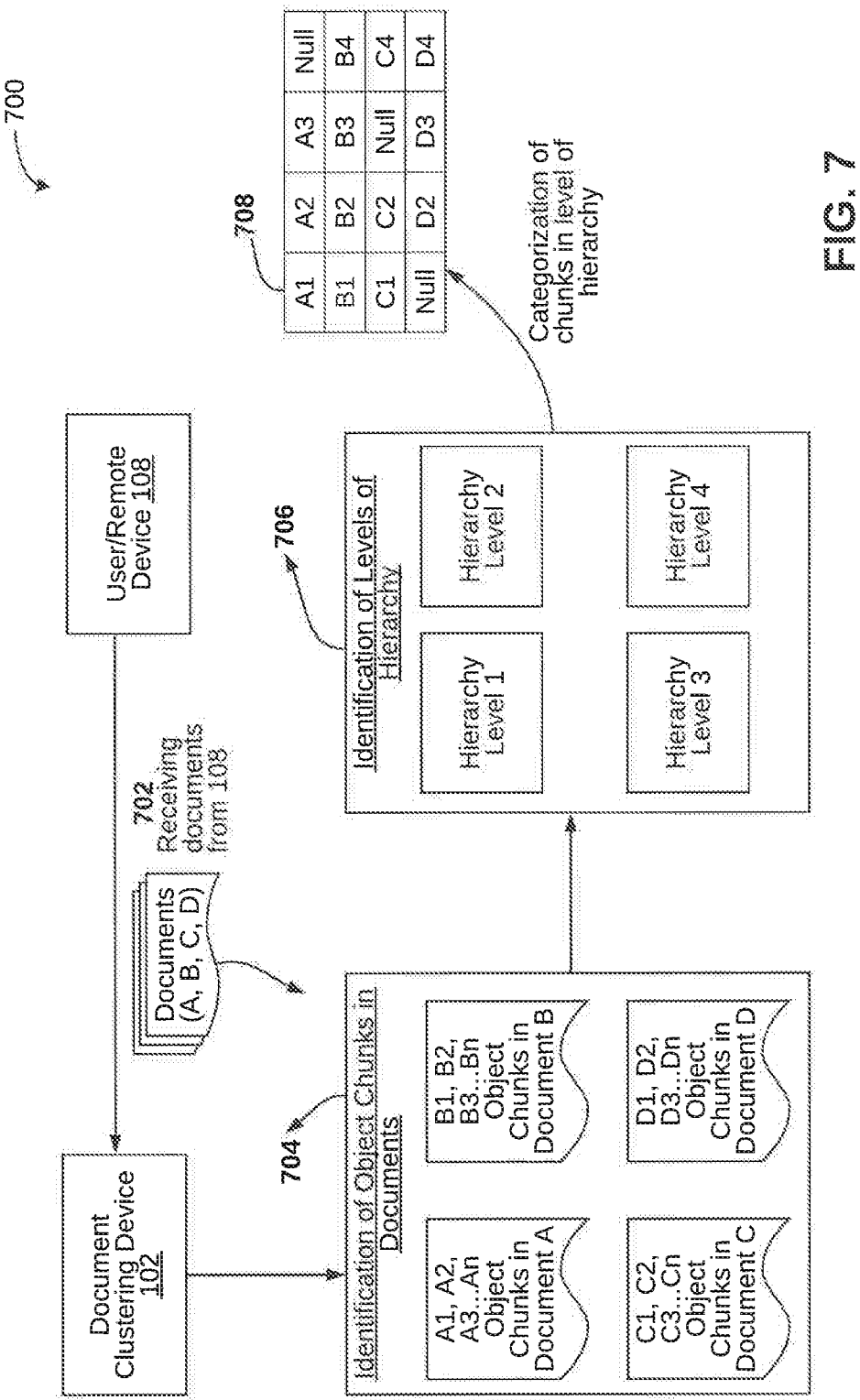
FIG. 7 is a block diagram for identification of chunks and categorization of chunks, in accordance with some embodiments of the present disclosure.

Referring now to FIG. 7, a block diagram for identification of chunks and categorization of chunks is illustrated, in accordance with some embodiments of the present disclosure. In an exemplary embodiment, at step 702, a number of documents (e.g., documents A, B, C, D) are received by a document clustering device 102, from a user device 108. After receiving documents, at step 704, the document clustering device 102 identifies object chunks for each document. The document A contains object chunks A1, A2, A3, A4 . . . An. Similarly, other remaining documents B, C, and D contains object chunks B1 . . . Bn, C1 . . . Cn, and D1 . . . Dn respectively. After identification of object chunks, at step 706, hierarchies (i.e., 1, 2, 3, and 4) of object chunks are determined based on iterative summarization of object chunks. After identification of hierarchy, at step 708, object chunks are categorized in a hierarchy based on the similarity of the index and information context with the hierarchy. By way of example, for the hierarchy level-1, the chunk "A1" from "A", "B1" from "B", and "C1" from "C" fit. Further, there is no chunk of "D" that has same level of abstraction or information. This is illustrated as first column of the matrix at step 708.

Figure 8:
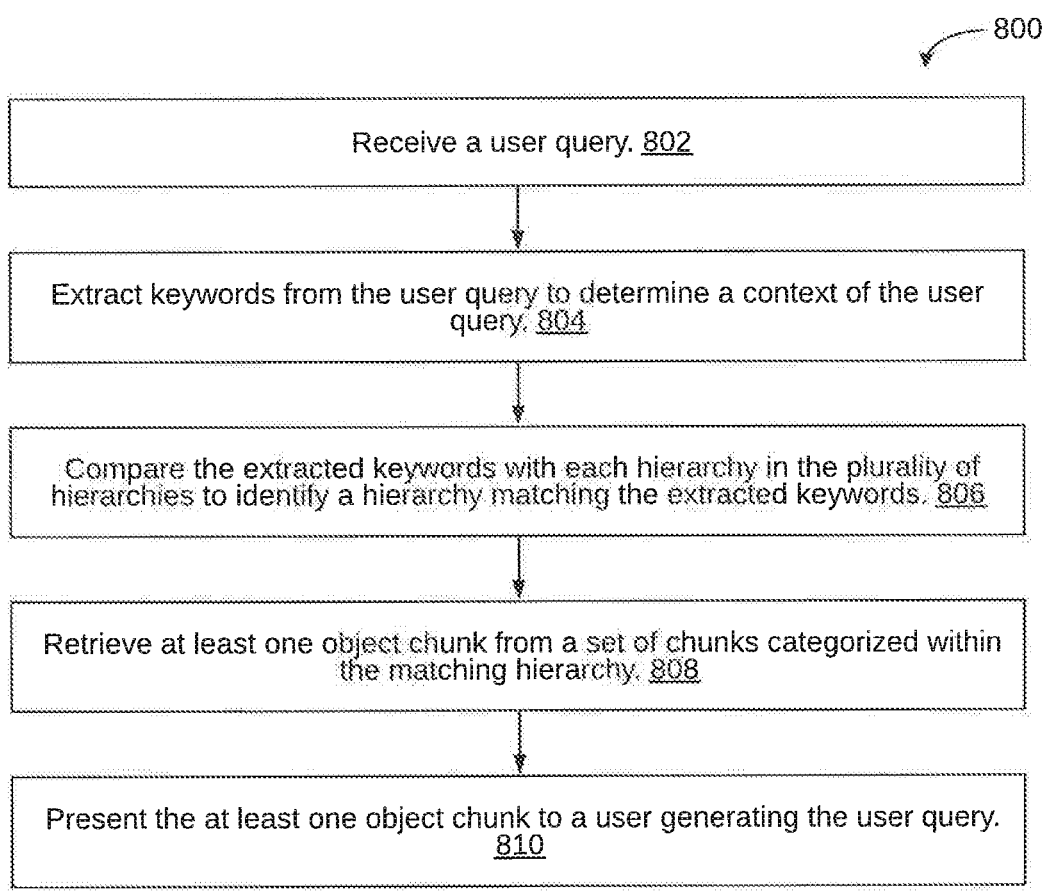
FIG. 8 is a flowchart of a method for retrieving information based on a user query, in accordance with some embodiments of the present disclosure.

Referring now to FIG. 8, a flowchart of a method for retrieving information based on a user query is illustrated, in accordance with some embodiments of the present disclosure. After categorizing object chunk in a hierarchy based on similarity of the index and the information context with the hierarchy, the document clustering device 102 is ready to provide information retrieval. At step 802, the document clustering device 102 receives a query of a user. The query of a user may include but is not limited to textual query or a vocal query. After receiving the query, at step 804, the document clustering device 102 extracts keywords from the query of the user to determine the context of the query. After extracting keywords, at step 806, the document clustering device 102 compares the extracted keywords with each hierarchy in the plurality of hierarchies to identify a hierarchy matching the extracted keywords. After comparison, at step 808, the document clustering device 102 retrieves at least one object chunk from a set of chunks categorized within the matching hierarchy. In some embodiments, the retrieval of object chunk is based on a history associated with the user which includes, but is not limited to, user familiarity with the document, ratings of the document on a social media, user experience with the document etc. After retrieving the object chunk, at step 810, the document clustering device 102 presents the at least one object chunk to the user generating the user query. To this end, the user gets the response to his query in an organized manner from one place in less time.

By way of example, the document clustering device 102 translates user query into the keywords used to select the right content from the clustered chunks. The request may be in the form of a search or a question. As will be appreciated, search requires more documents to be rendered with appropriate ranking while the question requires a precise answer. Further, in some embodiments, the document clustering device 102 supports conversation with the user so as to handle user request accordingly. Thus, if more clarity is required, the conversation is initiated with the user.

The retrieval of information is performed by determining the right item from a hierarchy of equal information. The document clustering device 102 uses a plurality of parameters and context to determine the right item from a hierarchy of equal information. When a user seeks information, one chunk from each level of hierarchy is pulled and concatenated to maintain the flow of response. The chunk that is pulled depends on the plurality of parameters such as user's familiarity of the source (i.e., document) of the chunk, the ratings of the document on a social media, the user's experience with the document (e.g. the author of the document if it is a book), continuity with previous response (e.g., if the user has already obtained chunks from the same document for a previous request). For a user query that is in form of a question, a degree of matching between the wordings of the user's query and the chunks is an important parameter for the selection of chunks.

Figure 9:
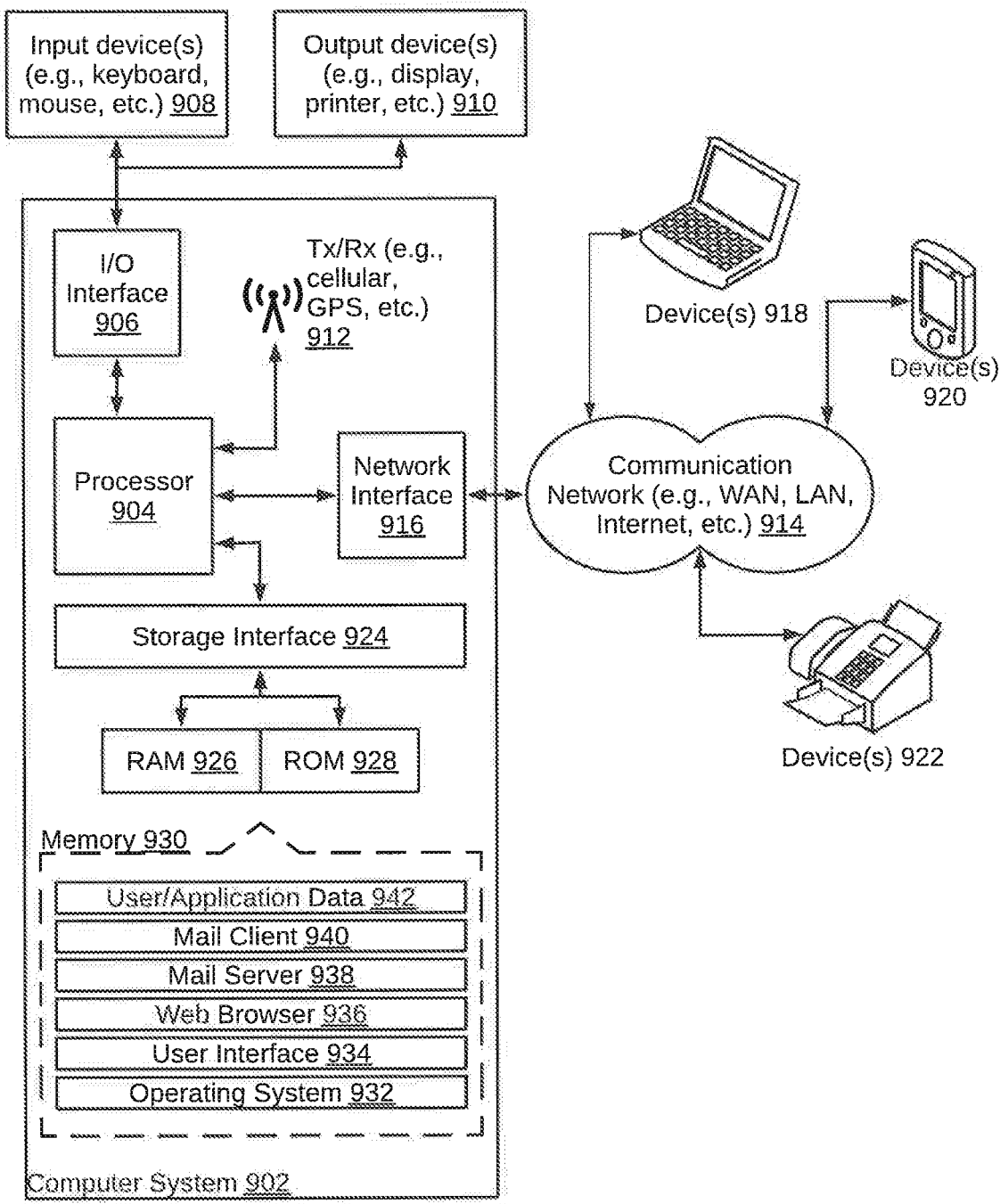
FIG. 9 is a block diagram of an exemplary computer system for implementing various embodiments.

Referring now to FIG. 9, a block diagram of an exemplary computer system 902 for implementing various embodiments is illustrated. The computer system 902 may include a central processing unit ("CPU" or "processor") 904. The processor 904 may include at least one data processor for executing program components for executing user- or system-generated requests. A user may include a person, a person using a device such as those included in this disclosure, or such a device itself. The processor 904 may include specialized processing units such as integrated system (bus) controllers, memory management control units, floating point units, graphics processing units, digital signal processing units, etc. The processor 904 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. The processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 904 may be disposed in communication with one or more input/output (I/O) devices via an I/O interface 906. The I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 906, the computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 910 may be a printer, fax machine, video display (e.g., cathode ray tube (CRT), liquid crystal display (LCD), light-emitting diode (LED), plasma, or the like), audio speaker, etc. In some embodiments, a transceiver 912 may be disposed in connection with the processor 904. The transceiver 912 may facilitate various types of wireless transmission or reception. For example, the transceiver 912 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618 PMB9800® transceiver, or the like), providing IEEE 802.6a/b/g/n, Bluetooth, FM, global positioning system (GPS), 2G/3G HSDPA/HSUPA communications, etc.

In some embodiments, the processor 904 may be disposed in communication with a communication network 914 via a network interface 916. The network interface 916 may communicate with the communication network 914. The network interface 916 may employ connection protocols including, without limitation, direct connect, Ethernet (e.g., twisted pair 50/500/5000 Base T), transmission control protocol/internet protocol (TCP/IP), token ring, IEEE 802.11 a/b/g/n/x, etc. The communication network 914 may include, without limitation, a direct interconnection, local area network (LAN), wide area network (WAN), wireless network (e.g., using Wireless Application Protocol), the Internet, etc. Using the network interface 916 and the communication network 914, the computer system 902 may communicate with devices 918, 920, and 922. These devices 918, 920, and 922 may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 902 may itself embody one or more of these devices 918, 920, and 922.

In some embodiments, the processor 904 may be disposed in communication with one or more memory devices (e.g., a Random Access Memory (RAM) 926, a Read Only Memory (ROM) 928, etc.) via a storage interface 924. The storage interface 924 may connect to a memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 930 may store a collection of program or database components, including, without limitation, an operating system 932, a user interface 934, a web browser 936, a mail server 938, a mail client 940, and user/application data 942 (e.g., any data variables or data records discussed in this disclosure), etc. The operating system 932 may facilitate resource management and operation of the computer system 902. Examples of the operating systems 932 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. The user interface 934 may facilitate display, execution, interaction, manipulation, or operation of program components through textual or graphical facilities. For example, the user interface 934 may provide computer interaction interface elements on a display system operatively connected to the computer system 902, such as cursors, icons, checkboxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, the computer system 902 may store the user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method, device, and system for clustering document objects based on information content. The method uses data clustering technique augmented with cognitive computing learning in order to respond to a query of a user. The method provides the user with a relevant response to his query by organizing the objects or documents in predefined hierarchy of object chunks at one place so that user may get the relevant response to his query without gathering information from many places. All the documents are stored in database 216 used in this disclosure which is used by the processor 904 of the computer system 902 when the user provides the query. When the user provides the query, processor of computer system 902 matches the hierarchy of keywords of the query with the stored hierarchy of object chunks and presents the relevant object chunk in response to the query of the user.

The specification has described method and device for method, device, and system for clustering document objects based on information content. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by the processor 904 may be stored. Thus, a computer-readable storage medium may store instructions for execution by one or more processors 904, including instructions for causing the processor(s) 904 to perform steps or stages consistent with the embodiments described herein. The term "computer-readable medium" should be understood to include tangible items and exclude carrier waves and transient signals, i.e., be non-transitory. Examples include the RAM 926, the ROM 928, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of clustering document objects based on information content, the method comprising:
    identifying, by a document clustering device, a plurality of object chunks from at least one document based on semantic context of each of the plurality of object chunks, wherein each of the plurality of object chunks comprise at least one object selected from the at least one document;
    determining, by the document clustering device, at least one document portion from the at least one document as a base document, based on a plurality of parameters applied to the plurality of object chunks, wherein the plurality of parameters comprises at least one of: a number of object chunks in each document portion, a number of object chunks in each document portion that are common with remaining document portions in the plurality of document portions, a number of object chunks in each document portion that overlap with one or more of the remaining document portions, or a number of documents from the at least one document that each document portion overlaps;
    determining, by the document clustering device, a plurality of hierarchies within the base document; and
    categorizing, by the document clustering device, the plurality of object chunks based on the plurality of hierarchies and information in each of the plurality of object chunks.

2. The method of claim 1, wherein each of the at least one object comprises at least one of text, an image, a figure, a table, or a graph.

3. The method of claim 1, wherein identifying an object chunk from the plurality of object chunks comprises:
    summarizing a paragraph within a document from the at least one document;
    iteratively adding at least one sentence to the paragraph;
    iteratively computing a summary quotient based on length of sentences within the paragraph and length of the at least one first sentence added in a current iteration; and
    iteratively comparing the summary quotient with a predefined threshold.

4. The method of claim 3, further comprising demarcating the object chunk in a current iteration, when the summary quotient in the current iteration exceeds the predefined threshold, wherein the demarcated object chunk excludes the at least one sentence added in the current iteration.

5. The method of claim 1, wherein determining the at least one document portion as the base document comprises:
    determining the plurality of parameters for each document portion in a plurality of document portions within the at least one document, wherein the plurality of document portions comprise the at least one document portion;
    computing, for each document portion, a weighted sum of the plurality of parameters in response to determining the plurality of parameters for each document portion; and
    selecting the at least one document portion as the base document in response to computing the weighted sum for each document portion, wherein the at least one document portion comprises the highest weighted sum.

6. The method of claim 1, wherein categorizing an object chunk from the plurality of object chunks comprises:
    creating an index for the object chunk based on iterative summarization of the object chunk; and
    extracting information context from the object chunk based on frequency of occurrence of each term in the object chunk and total number of terms in the object chunk.

7. The method of claim 6, wherein iterative summarization is performed to reduce a summary of the object chunk to a predefined number of words.

8. The method of claim 6, wherein the object chunk is categorized in a hierarchy from the plurality of hierarchies based on similarity of the index and the information context with the hierarchy.

9. The method of claim 1 further comprising receiving a user query, wherein the user query comprises at least one of textual query and a vocal query.

10. The method of claim 9 further comprising:
    extracting keywords from the user query to determine a context of the user query;
    comparing the extracted keywords with each hierarchy in the plurality of hierarchies to identify a hierarchy matching the extracted keywords;
    retrieving at least one object chunk from a set of chunks categorized within the matching hierarchy; and
    presenting the at least one object chunk to a user generating the user query.

11. The method of claim 10, wherein the at least one object chunk is retrieved based on history associated with the user.

12. A system for clustering document objects based on information content, system comprising:
    a document clustering device comprising at least one processor and a memory storing instructions that, when executed by the at least one processor, cause the at least one processor to perform operations comprising:
        identifying a plurality of object chunks from at least one document based on semantic context of each of the plurality of object chunks, wherein each of the plurality of object chunks comprise at least one object selected from the at least one document;
        determining at least one document portion from the at least one document as a base document, based on a plurality of parameters applied to the plurality of object chunks, wherein the plurality of parameters comprises at least one of: a number of object chunks in each document portion, a number of object chunks in each document portion that are common with remaining document portions in the plurality of document portions, a number of object chunks in each document portion that overlap with one or more of the remaining document portions, or a number of documents from the at least one document that each document portion overlaps;
        determining a plurality of hierarchies within the base document; and
        categorizing the plurality of object chunks based on the plurality of hierarchies and information in each of the plurality of object chunks.

13. The system of claim 12, wherein identifying an object chunk from the plurality of object chunks comprises:

summarizing a paragraph within a document from the at least one document;

iteratively adding at least one sentence to the paragraph;

iteratively computing a summary quotient based on length of sentences within the paragraph and length of the at least one first sentence added in a current iteration; and iteratively comparing the summary quotient with a predefined threshold.

14. The system of claim 13, wherein the operations further comprise demarcating the object chunk in a current iteration, when the summary quotient in the current iteration exceeds the predefined threshold, wherein the demarcated object chunk excludes the at least one sentence added in the current iteration.

15. The system of claim 12, wherein determining the at least one document portion as the base document comprises:

determining the plurality of parameters for each document portion in a plurality of document portions within the at least one document, wherein the plurality of document portions comprise the at least one document portion;

computing, for each document portion, a weighted sum of the plurality of parameters in response to determining the plurality of parameters for each document portion; and selecting the at least one document portion as the base document in response to computing the weighted sum for each document portion, wherein the at least one document portion comprises the highest weighted sum.

16. The system of claim 12, wherein categorizing an object chunk from the plurality of object chunks comprises:

creating an index for the object chunk based on iterative summarization of the object chunk; and extracting information context from the object chunk based on frequency of occurrence of each term in the object chunk and total number of terms in the object chunk.

17. The system of claim 16, wherein iterative summarization is performed to reduce a summary of the object chunk to a predefined number of words, and wherein the object chunk is categorized in a hierarchy from the plurality of hierarchies based on similarity of the index and the information context with the hierarchy.

18. The method of claim 12, wherein the operations further comprise:

receiving a user query;

extracting keywords from the user query to determine a context of the user query;

comparing the extracted keywords with each hierarchy in the plurality of hierarchies to identify a hierarchy matching the extracted keywords;

retrieving at least one object chunk from a set of chunks categorized within the matching hierarchy, wherein the at least one object chunk is retrieved based on history associated with the user; and presenting the at least one object chunk to a user generating the user query.

19. A non-transitory computer-readable medium storing computer-executable instructions for:

identifying a plurality of object chunks from at least one document based on semantic context of each of the plurality of object chunks, wherein each of the plurality of object chunks comprise at least one object selected from the at least one document;

determining at least one document portion from the at least one document as a base document, based on a plurality of parameters applied to the plurality of object chunks, wherein the plurality of parameters comprises at least one of: a number of object chunks in each document portion, a number of object chunks in each document portion that are common with remaining document portions in the plurality of document portions, a number of object chunks in each document portion that overlap with one or more of the remaining document portions, or a number of documents from the at least one document that each document portion overlaps;

determining a plurality of hierarchies within the base document; and categorizing the plurality of object chunks based on the plurality of hierarchies and information in each of the plurality of object chunks.

* * * * *